(12) United States Patent
Johnson et al.

(10) Patent No.: US 8,578,449 B2
(45) Date of Patent: Nov. 5, 2013

(54) REPLICATING SELECTED SECRETS TO LOCAL DOMAIN CONTROLLERS

(75) Inventors: Gregory C. Johnson, Bellevue, WA (US); Nathan Daniel Muggli, Redmond, WA (US); William Birkin Lees, Redmond, WA (US); William S. Jack, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1640 days.

(21) Appl. No.: 11/241,084

(22) Filed: Sep. 30, 2005

(65) Prior Publication Data

US 2006/0282879 A1    Dec. 14, 2006

Related U.S. Application Data

(63) Continuation of application No. 11/149,649, filed on Jun. 10, 2005, now Pat. No. 8,296,824.

(51) Int. Cl.
  *G06F 7/04*    (2006.01)
(52) U.S. Cl.
  USPC ............................................................. 726/3
(58) Field of Classification Search
  USPC ............................................................. 726/3
  See application file for complete search history.

(56) References Cited

U.S. PATENT DOCUMENTS

| | | | |
|---|---|---|---|
| 5,611,048 A | 3/1997 | Jacobs et al. | 726/5 |
| 6,895,434 B1 * | 5/2005 | Chandrupatla et al. | 709/223 |
| 7,013,389 B1 | 3/2006 | Srivastava et al. | 713/163 |
| 8,132,232 B2 | 3/2012 | Vasudevan | |
| 2002/0095497 A1 * | 7/2002 | Satagopan et al. | 709/225 |
| 2003/0120948 A1 * | 6/2003 | Schmidt et al. | 713/200 |
| 2005/0154915 A1 | 7/2005 | Peterson et al. | 713/201 |
| 2006/0224891 A1 | 10/2006 | Ilac et al. | |
| 2006/0282881 A1 | 12/2006 | Johnson et al. | |
| 2010/0162361 A1 | 6/2010 | Lees et al. | |
| 2013/0013787 A1 | 1/2013 | Johnson et al. | |

OTHER PUBLICATIONS

Office Action, dated Jan. 7, 2009, issued in U.S. Appl. No. 11/149,649, (11 pp).
Office Action, dated Jun. 24, 2009, issued in U.S. Appl. No. 11/149,649, (13 pp).
Office Action, dated Mar. 30, 2010, issued in U.S. Appl. No. 11/149,649, (14 pp).
Office Action, dated Nov. 16, 2009, issued in U.S. Appl. No. 11/149,649, (14 pp).

(Continued)

*Primary Examiner* — Philip Chea
*Assistant Examiner* — Daniel Hoang
(74) *Attorney, Agent, or Firm* — Merchant & Gould P.C.

(57) ABSTRACT

A domain controller hierarchy includes one or more hub domain controllers in communication with one or more local domain controllers, such as local domain controllers at a branch office. The hub domain controller(s) is writable, while the local domain controller(s) is typically read-only. Non-secure and secure information is partitioned to specific local domain controllers at the one or more hub domain controllers. The non-secure and secure information is then passed from the hub domain controller only to the local domain controller associated with the given partition at the hub domain controller on request. For example, a user requests a logon at a client computer system at a local branch office, and the logon is passed from the local domain controller to the hub domain controller. If authenticated, the user logon account is passed to the local domain controller, where it can be cached to authenticate subsequent requests.

20 Claims, 8 Drawing Sheets

(56) References Cited

OTHER PUBLICATIONS

Response to Office Action, dated Apr. 7, 2009, filed in U.S. Appl. No. 11/149,649, (14 pp).
Response to Office Action, dated Dec. 8, 2009, filed in U.S. Appl. No. 11/149,649, (12 pp).
Response to Office Action, dated Jun. 30, 2010, filed in U.S. Appl. No. 11/149,649, (16 pp).
Response to Office Action, dated Sep. 18, 2009, filed in U.S. Appl. No. 11/149,649, (16 pp).
U.S. Appl. No. 12/638,852, Amendment and Response filed Dec. 27, 2011, 10 pgs.
Notice of Allowance, dated Jun. 18, 2012, issued in U.S. Appl. No. 11/149,649, (12 pp).
Non-Final Office Action, dated Jun. 7, 2012, issued in U.S. Appl. No. 12/638,852 (8 pp).
U.S. Appl. No. 11/149,649, Amendment and Response filed Sep. 7, 2012, 8 pgs.
U.S. Appl. No. 11/149,649, USPTO Response mailed Sep. 24, 2012, 2 pgs.
U.S. Appl. No. 12/638,852, Amendment and Response filed Sep. 7, 2012, 10 pgs.
U.S. Appl. No. 12/638,852, Notice of Allowance mailed Sep. 25, 2012, 11 pgs.
U.S. Appl. No. 12/638,852, Amendment and Response filed Dec. 18, 2012, 3 pgs.
U.S. Appl. No. 12/638,852, USPTO Response mailed Jan. 8, 2013, 2 pgs.
U.S. Appl. No. 13/618,934, Office Action mailed Mar. 15, 2013, 14 pgs.
Office Action, dated Sep. 28, 2011, issued in U.S. Appl. No. 12/638,852, (6 pp).

* cited by examiner

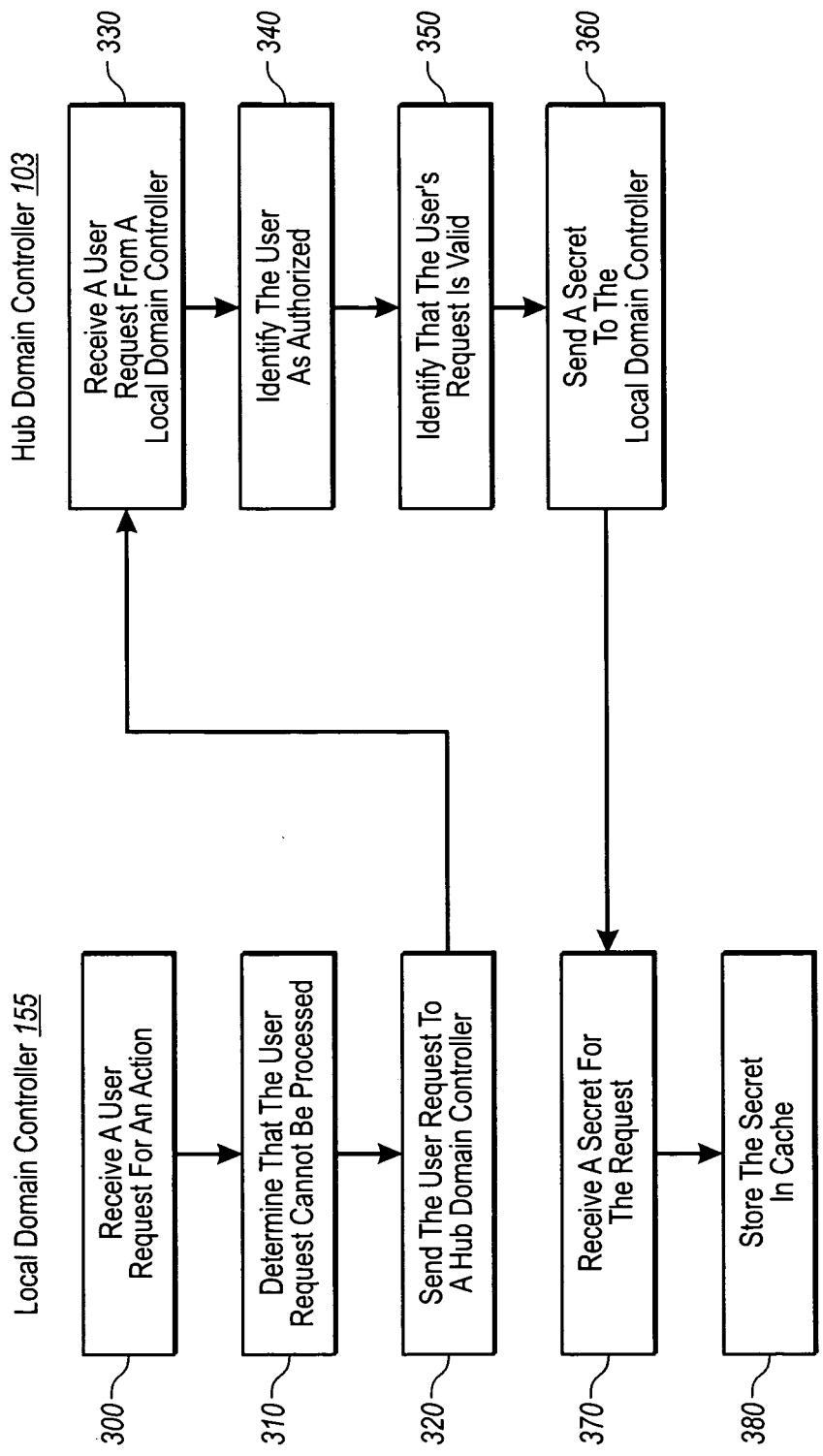

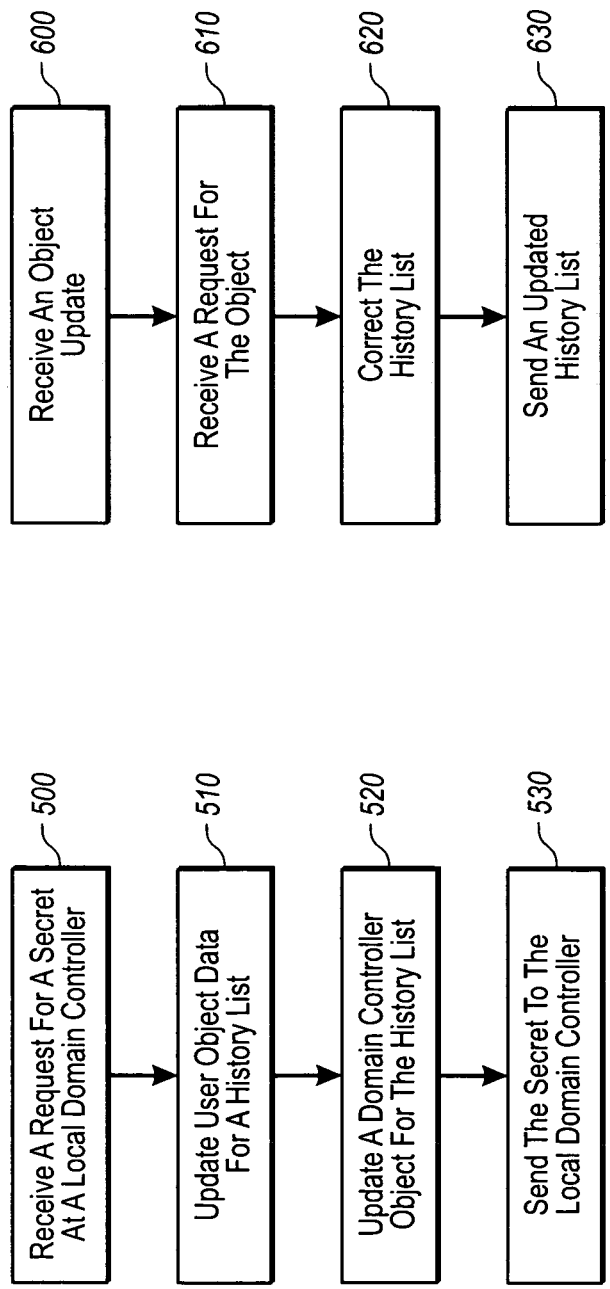

REPLICATING SELECTED SECRETS TO LOCAL DOMAIN CONTROLLERS

CROSS-REFERENCE TO RELATED APPLICATIONS

The present application is a continuation of U.S. patent application Ser. No. 11/149,649, now U.S. Pat. No. 8,296,824), filed on Jun. 10, 2005, entitled "Replicating Selected Secrets to Local Domain Controllers", the entire contents of which are incorporated herein by reference.

TECHNICAL FIELD

The present disclosure relates to systems, methods, and computer program products for managing resources in a domain controller system.

BACKGROUND

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources on a network have also increased.

Generally, there are a number of different mechanisms and protocols for distributing resources among computer systems. For example, two or more computers in a corporate network can share resources, such as files, application programs, or the like, over, for example, a Local Area Network ("LAN"), or a Wide Area Network ("WAN"). The computers can share these resources using any number of currently available transmit and receive communication protocols established between them.

More complicated schematics for sharing resources on a network include, for example, a domain controller hierarchy scheme, which is used in some implementations to organize and share both secure and non-secure resources in an efficient manner. For example, a central hub domain controller might be used to manage user names, passwords, computer names, network identifiers, or the like, and provide the information through a hierarchy of remote and local servers (i.e., local domain controllers). The various domain controllers, in turn, are configured with a Security Account Manager ("SAM"), which provides interfaces and storage for holding or passing along security information within the domain hierarchy. When one or more individual client computer systems requests a resource, the request may be passed along the hierarchy before the user receives a response.

In one example, a large pharmaceutical company that has several local branch offices (e.g., neighborhood pharmacies), might want to establish a local domain controller at each of the different local pharmacies. The company might do so by establishing a domain controller at each branch office. Each different branch office might therefore be part of a sub-domain in the hierarchy, or might even represent its own individual sub-domain of yet another sub-domain in the company's domain hierarchy. The established domain controller is typically configured for, among other things, operating in accordance with resource guidelines pushed downward from the centralized hub domain controller.

In this example, the hub domain controller will be "writable" or configured to be written-to by an administrator in the main organization for the branch domain. By contrast, the local domain controllers to which the central writable domain controller connect in the branch domain, however, will be "read-only", and not therefore configured to be written-to in any meaningful way by the local users, or sometimes even the network administrator. In such an example, each local domain controller would be configured primarily, for example, to pass along user requests, such as a logon request, to the writable hub domain controller, and then pass along the relevant account approval information sent back from the hub domain controller. For example, a user logs onto a client machine, and the local domain controller forwards the request to the hub domain controller for authentication. If the hub domain controller verifies the user's entered information, the hub domain controller instructs the local domain controller to allow the user to logon to the client computer system.

While this example schematic might have an advantage of being highly centralized, it also has a number of different difficulties, such as a low degree of local configurability (or none at all) for the various local domain controllers. For example, in order for a user to change a password (or reconfigure another resource), the user will usually need to contact an administrator managing the hub domain controller, who will then change the password (or resource) at the hub domain controller before the user can use the new password (or resource) at the local branch. Furthermore, although minimizing the amount of technical support staff needed at the local branch, this centralized domain controller schematic represents a single point of failure throughout the entire company's network. For example, when the hub domain controller is unavailable for any reason, users at the local branch might be unable to access a certain resource (e.g., logon to their respective client computer systems), since the local domain controller will not store the given information necessary to validate the client's request.

Alternative implementations to the foregoing examples include local and hub domain controllers that are each writable. Under this type of schematic, the hub domain controller sends not just resource configuration information, but also security account information for the company or organization, such that each local domain controller stores all security accounts for the company. Thus, when any user of the company logs onto any client machine at any local branch, the local domain controller, rather than the hub domain controller, authenticates the user's credentials, and provides client computer system access. Since resources such as these are stored locally, the user may also be able to configure other resources at the local domain controller, such as the shareability of a certain file, or access to another file system, or the like. Furthermore, an appropriately authorized user can also change or update certain security account (or other configuration) information at the local domain controller, as opposed to changing this information by dealing with the network administrator of the hub domain controller. Changes at the user's local domain controller are then propagated throughout the other local and remote domain controllers in the hierarchy.

While this writable local and remote domain controller schematic has an advantage of decentralizing domain controller configurability and access, this schematic can also present other potential problems, such as security issues, when used in local branch offices that do not have trained technical support staff. For example, there is a heightened risk that one of the local users at a local branch might inadvertently modify a resource at the local domain controller that should not be modified. This is possible in part since many resources in present operating systems now come with a high degree of configuration granularity, which is difficult, if not impossible, for many non-technical branch users to successfully navigate. If there is no local technical support when a configuration mistake is made, the local branch might have to wait until a trained network administrator can fix the problem on-site, or fix it over the company's network as available.

One can appreciate that the writable local and remote domain controller schematic also presents a variety of exposure concerns. For example, the local domain controllers in the prior example may be accessible by other local domain controllers on the company network, and sometimes also by others on an outside, non-corporate network (e.g., Internet). Furthermore, the writable local domain controllers can present heightened security risks due to physical intrusion concerns, since, as a practical matter, organizations tend not to place the local domain controllers in physically secure locations. That is, the organization may want the benefits of a writable local domain controller, but not want to expend the resources to guard against virtual and physical security risks. Such physical risks can include removal or replacement of server hardware (e.g., hard drives, and the like).

As such, a number of difficulties can be found both with schematics with one writable domain controller and those with all domain controllers being writable, particular when implemented in branch locations that are separated from a head office location.

BRIEF SUMMARY OF EXEMPLARY IMPLEMENTATIONS

The present invention solves one or more of the foregoing problems with systems, methods, and computer program products configured to provide a local domain controller with sufficient information to handle the various user needs of a branch location in a secure and efficient manner. For example, implementations of the present invention include a hub domain controller that partitions various users in a company or organization into various branch locations. The hub controller then provides the local domain controllers with the user accounts that are needed in those various branch locations when requested.

In one implementation, a method for authenticating a user request involves receiving a user request for an action at a client computer system, where the user request requires authentication. The local domain controller then determines that the user request cannot be processed with information stored at a local domain controller, and sends the user request to a hub domain controller over a network. If processed successfully, the local domain controller then receives a secret for the user's request from the hub domain controller, and stores the secret in the local domain controller cache. As such, the local domain controller does not necessarily need to receive a record of all resources in the domain, and can validate a subsequent user request with a cache entry.

In another implementation, a method for providing secure and non-secure information to a local domain controller in a selective manner includes receiving a user request via a local domain controller. In one case, the user request involves an action, such as a logon request at a client computer system in a branch location. The hub domain controller then identifies that the user is authorized to perform the action at the branch location. The hub domain controller also identifies that the user request is consistent with a secret maintained at the hub domain controller. If the request is consistent, and the user is authorized to perform the action at the branch location, the hub domain controller sends the secret to the local domain controller. Thus, the local domain controller can cache the secret and therefore handle a subsequent user request for the action at the branch location.

Additional schematics and methods described herein relate in part to the granularity of information that can be identified by an administrator. For example, implementations of the present invention provide means for readily determining what versions of a given resource for what user were revealed to what branch. In particular, queries along these lines can be made given a branch location (i.e., what secrets of what users are revealed at Branch A?), or given a user (i.e., where have the secrets for this user been revealed?). Accordingly, implementations of the present invention provide a number of mechanisms for improving security as well as easy of use and maintenance in a domain controller hierarchy.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates methods comprising a sequence of acts from the local domain controller and hub domain controller perspectives for communicating selected secrets in an efficient manner; and FIG. 5 illustrates a method comprising a sequence of acts for updating a history list in response to a request for an action at a branch location; and FIG. 6 illustrates a method comprising a sequence of acts for updating a history list in response to one or more credentials received from one or more local domain controllers.

DETAILED DESCRIPTION OF EXEMPLARY IMPLEMENTATIONS

The present invention solves one or more of the foregoing problems with systems, methods, and computer program products configured to provide a local domain controller with sufficient information to handle the various user needs of a branch location in a secure and efficient manner. For example, implementations of the present invention include a hub domain controller that partitions various users in a company or organization into various branch locations. The hub controller then provides the local domain controllers with the user accounts that are needed in those various branch locations when requested.

As will be understood more fully from the following specification and claims, a company or organization can place domain controllers in a local branch location without many of the liability concerns previously needed. For example, in one implementation, each local branch is provided with a Read-Only Domain Controller ("RODC") that is essentially independent compared to other local domain controllers in a domain controller hierarchy. The local (read-only) domain controller can only be written-to by a central hub domain controller. As such, the local domain controller cannot be written-to by a local user, by another user at another local domain controller, or even by a malicious user from an outside network. This provides a number of security and ease-of-use limits on potential liabilities from misuse.

In addition, the local (read-only) domain controller is configured to only store the resources (e.g., user accounts "secrets") that are needed for that branch location. For example, as will be understood more fully from the following specification and claims, the hub domain controller partitions for each branch which users can login to client computer systems at the given branch. The hub domain controller, however, does not automatically provide these resources to all local domain controllers at each branch, but provides only those authorized secrets to the given branch upon an appropriate login by the user. Thus, in one implementation, the local (read-only) domain controller is configured to receive and store only a select few of the company's or organization's secrets, which can limit the potential security exposure of the server.

Figure 1A:
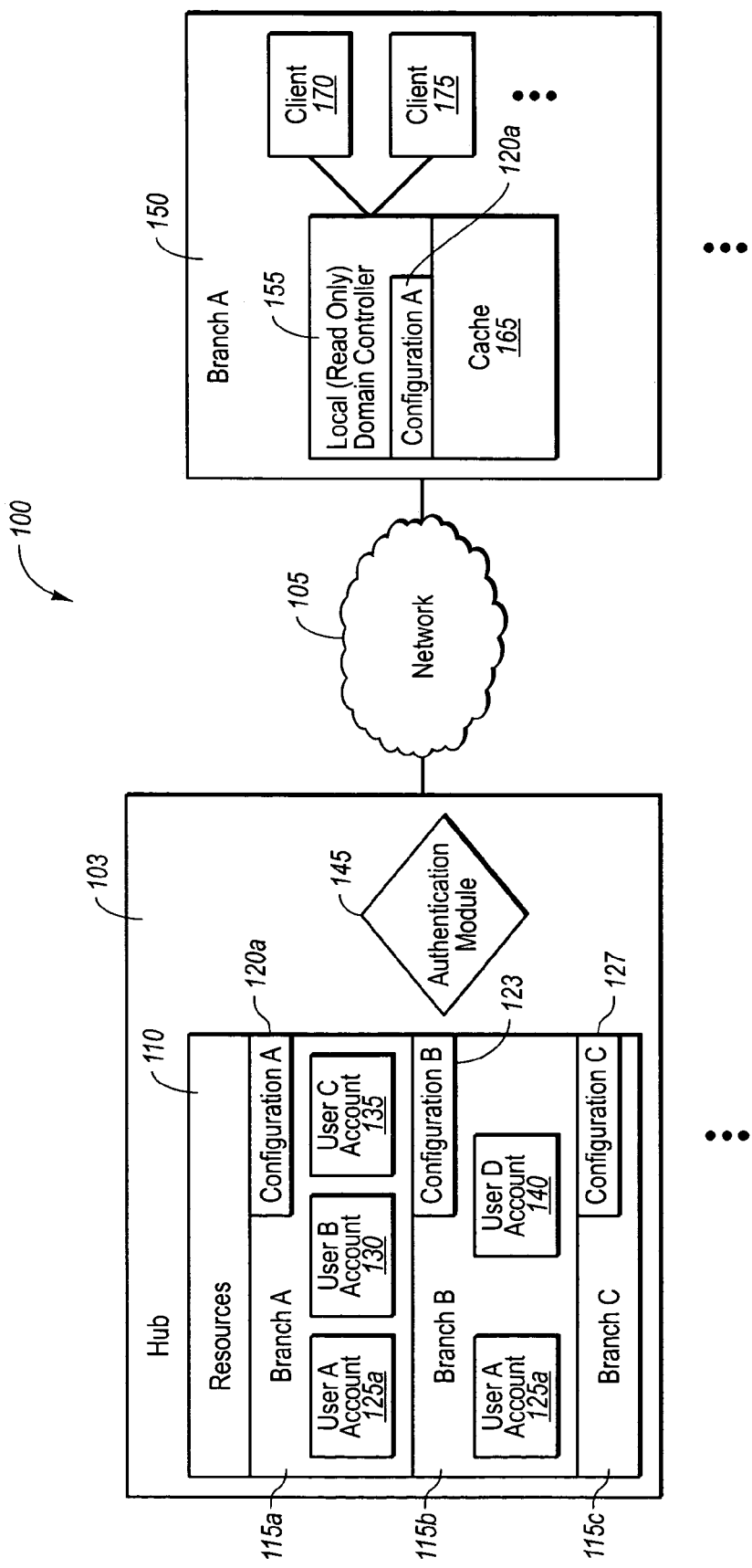
FIG. 1A is a schematic diagram of a domain controller hierarchy in accordance with an implementation of the present invention, showing one or more central hub domain controllers connected over a network to one or more local domain controllers at corresponding one or more branch locations.

For example, FIG. 1A illustrates a domain controller system 100, where one or more central hub domain controllers (e.g., 103) are connected to one or more local (read-only) domain controllers (e.g., 155) at one or more corresponding local branches 150 over a network 105. In general, the hub domain controller 103 is writable, meaning that an authorized network administrator can write, change, update or delete configuration preferences, user accounts, and/or a variety of other components at the hub domain controller 103. By contrast, the local (read only) domain controller 155 cannot generally be written-to except from a trusted source (e.g., the hub domain controller 103) in the domain hierarchy 100, but not typically from another user at the branch, or from another local domain controller.

As shown, the hub domain controller 103 includes a resources component 110, which comprises all of the configuration, non-secret, and secret information that is used or available with each branch domain controller (e.g., 155). For example, in one implementation, the resources component 110 contains all of the user accounts in the company or organization, including the corresponding user names and passwords. The resources component 110 also contains all user name and password versioning information, as well as versioning information for various configuration information needed at a given branch. The hub domain controller 103 is configured to change configuration resources and/or location of resources/secrets for each different local domain controller.

For example, FIG. 1A shows that the resources component 110 has a partition for "Branch A" 115a that identifies "Configuration A" 120a information, and includes "User Account A" 125a, "User Account B" 130, and "User Account C" 135. The resources component 110 also includes a partition for "Branch B" 115b that identifies "Configuration B" 123 information, and includes "User Account A" 125a, and "User Account D" 140. The resources component 110 further includes a partition for "Branch C" 115c that identifies at least "Configuration C" 127 information. Notably, FIG. 1A shows that "User Account A" 125a is present in both the branch 115a and branch 115b partitions since the corresponding user is allowed to access client computer systems at both branches. For example, the user is a company manager visiting a given branch office in the company later in the day.

FIG. 1A also shows a branch office 150 having a local (read-only) domain controller 155 (or "local domain controller") that is connected to one or more client computer systems 170 and 175. In at least one implementation, the local domain controller is read-only to protect the computer system from malicious or inadvertent configuration errors, as well as to protect other problems that can occur when inappropriately written-to by a local user, or otherwise non-trusted source. FIG. 1A further shows that the local domain controller 155 comprises at least configuration information 120a received from the hub domain controller 103, as well as a cache 165 for storing secrets, such as resources (e.g., secure user accounts), or the like. In particular, FIG. 1A shows that the local domain controller 155 is in a default configuration, where no local user accounts are stored in cache 165.

Figure 1B:
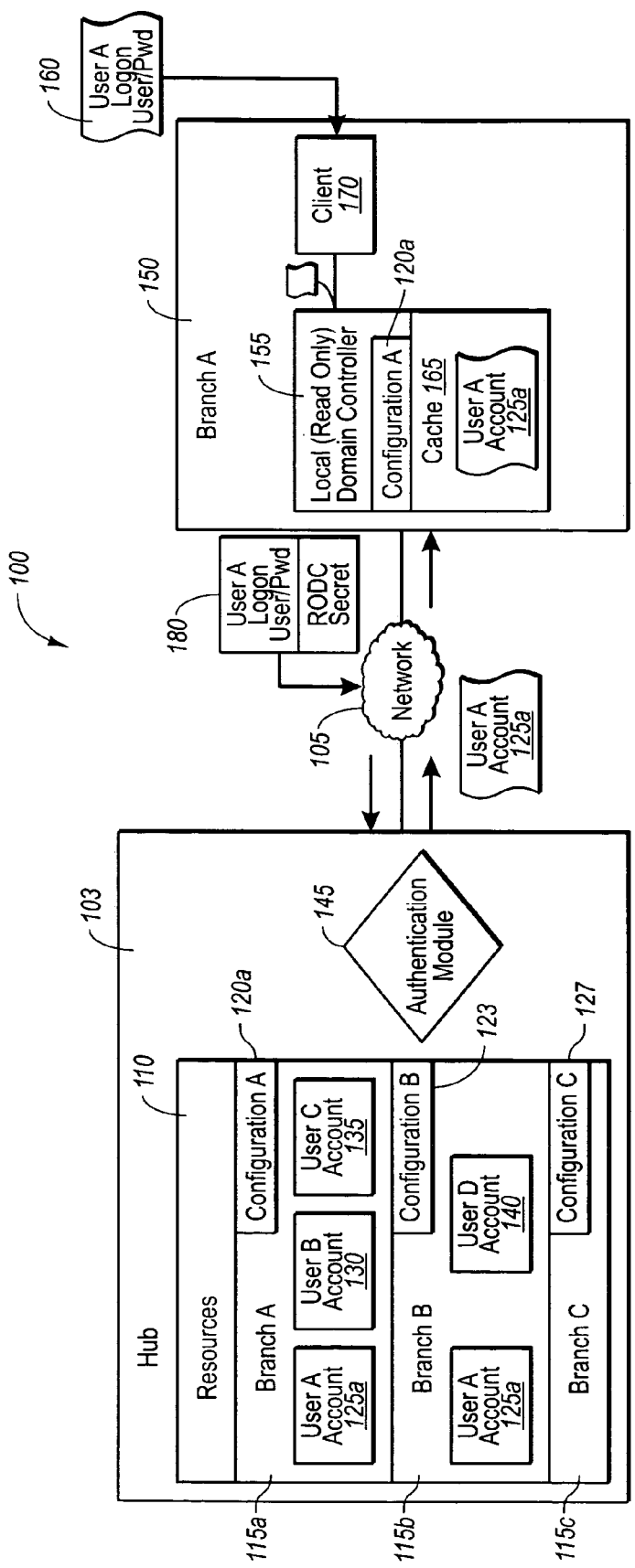
FIG. 1B illustrates the domain controller hierarchy as shown in FIG. 1A, in which a user at a local branch attempts to logon to a client computer system.

Thus, as shown in FIG. 1B, when a user at the local branch 150, such as a generic employee or a local administrator, attempts to logon to a client computer system 170, the logon request 160 is not necessarily authenticated directly by the local domain controller 155. Rather, the local domain controller 155 passes the logon request 160 with the local domain controller's secret in a separate message 180 through a secure communication channel. (The local domain controller 155 can also be configured to perform basic, preliminary authentication measures to ensure that random unauthorized users do not attempt to pull secrets from the hub domain controller by spoofing accounts). In one implementation, the local domain controller's secret is a secret provided previously by the hub domain controller 103, and accessible only to the local domain controller 155. The message 180 is ultimately then received and processed by an authentication module 145 at the hub domain controller 103.

The authentication module 145 identifies whether the local domain controller's secret and the user's logon credentials provided in message 180 are authentic and current. If either the local domain controller's secret or the user's logon credentials are not current, not valid, or not authentic for some other reason, the hub domain controller 103 returns an error to the local domain controller. Assuming, nevertheless, that the local domain controller's secret is valid, the authentication module 145 also checks to see if "User A" is allowed to access the resource (e.g., logon) at "Branch A" 150. For example, if User A is allowed to logon at Branch B (not shown), but not allowed to logon at the requested branch (i.e., "Branch A"), the authentication module 145 might allow the login, but will not allow the Branch domain controller to cache the user's secret (e.g., user account 125a). Alternatively, the hub domain controller can return an error, if appropriate.

As shown in FIG. 1B, the local domain controller secret and the user's provided logon credentials (e.g. message 160) are valid. In addition, the user account 125a is found in the partition 115a for the Branch A domain controller. As such, the authentication module 145 of the hub controller 103 returns the current user account 125a to the local domain controller 155 through a secure communication channel. That is, the hub domain controller 103 returns the user account 125a back to the local domain controller 155, along with a message indicating the user's initial logon 160 was acceptable. Upon receipt, the local domain controller 155 then stores the user account 125a in cache 165, and tells (not shown) the client computer system 170 to allow access to the user. Since the local domain controller 155 now has the user's account 125a in cache 165, the local domain controller 155, rather the central hub domain controller 103, can handle future logon requests by this user for the action (i.e., logon request in this case).

As such, FIGS. 1A and 1B show that the local domain controller 155, and hence the local branch 150, are only given cacheable access to a secret upon a valid request by a user who is allowed to logon at the particular branch, and who is allowed to have an account cached at the branch. Thus, potential liability is limited even in situations where another malicious person might try to simulate all possible logon requests at a given branch, and "pull" those accounts down to the branch. In particular, secure account information can only be "pulled" when properly authenticated in multiple levels (e.g., basic authentication at the local level, full authentication of secrets at the hub domain controller, and/or verification of appropriate cacheability status for the local domain controller and the user).

The illustrated "as needed" or "on-demand" type of approach, however, is not required in all situations. For example, an authorized branch manager (of another branch) or company president may be visiting branch 150 that day, and will need to access one or more of the client computer systems for presentation purposes. An authorized user, such as the local network administrator for the local domain controller, can request the visitor's account in advance. For example, the local network administrator can send a request through the local domain controller 155, or through another local client computer system (e.g., 170) to the hub that requests the visitor's account.

As with prior requests, the request for advanced access also includes authentication information for the requester, as well as the secret for the local domain controller provided earlier by the hub domain controller 103. The authentication module 145 at the hub domain controller 103 then checks to see if the visitor's account is one that can be provided in advance, and, if appropriate checks the credentials of the requester. For example, the hub domain controller can check the requester's credentials if the requester has not yet been cached at the local domain controller where the requester is making the request.

In addition, the hub domain controller 103 can check to see if the secret provided by the local domain controller is accurate. If appropriate, the hub domain controller 103 then passes the visitor's user account to the local domain controller, where it can be stored in cache 165 for an appropriate amount of time. When that amount of time has expired (e.g., when periodic updates are scheduled to be sent and received next), the hub domain controller can send information that invalidates the metadata of the secret received in advance. As will be understood more fully from the following text and claims, the messaging invalidating the secret's metadata itself comprises one or more timestamps to ensure proper ordering, prioritization, and discarding of invalid secrets cached or received by the local domain controller.

Figure 2A:
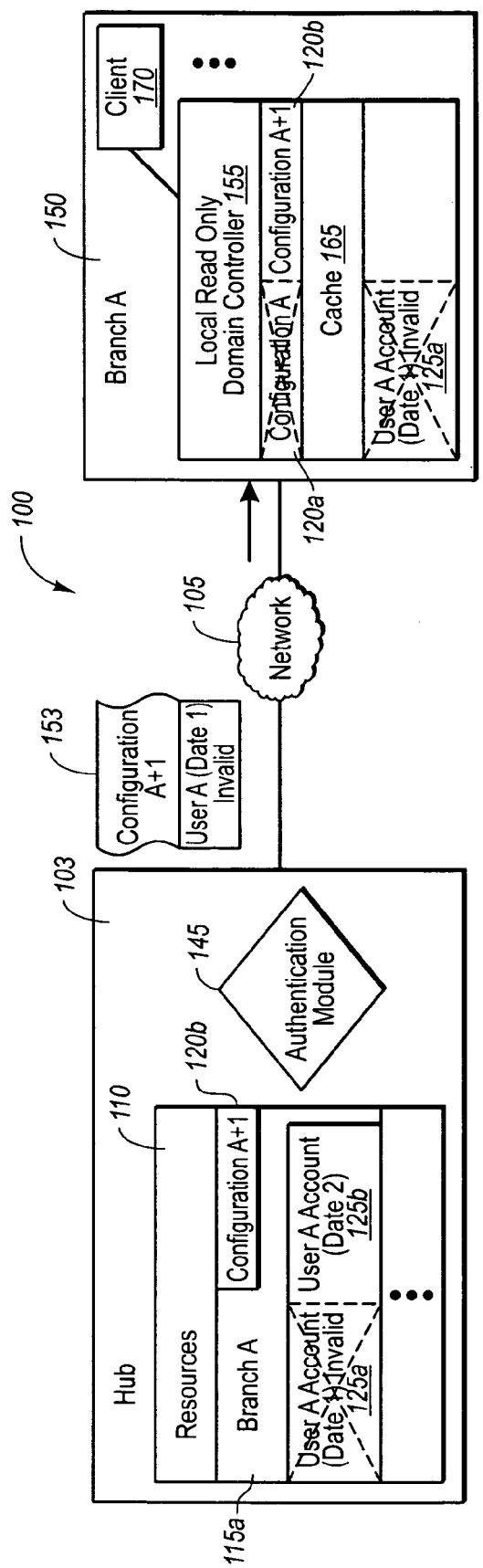
FIG. 2A illustrates the domain controller hierarchy as shown in FIG. 1A, in which the hub domain controller sends an update of configuration information to the local domain controller at the branch location.
Figure 2B:
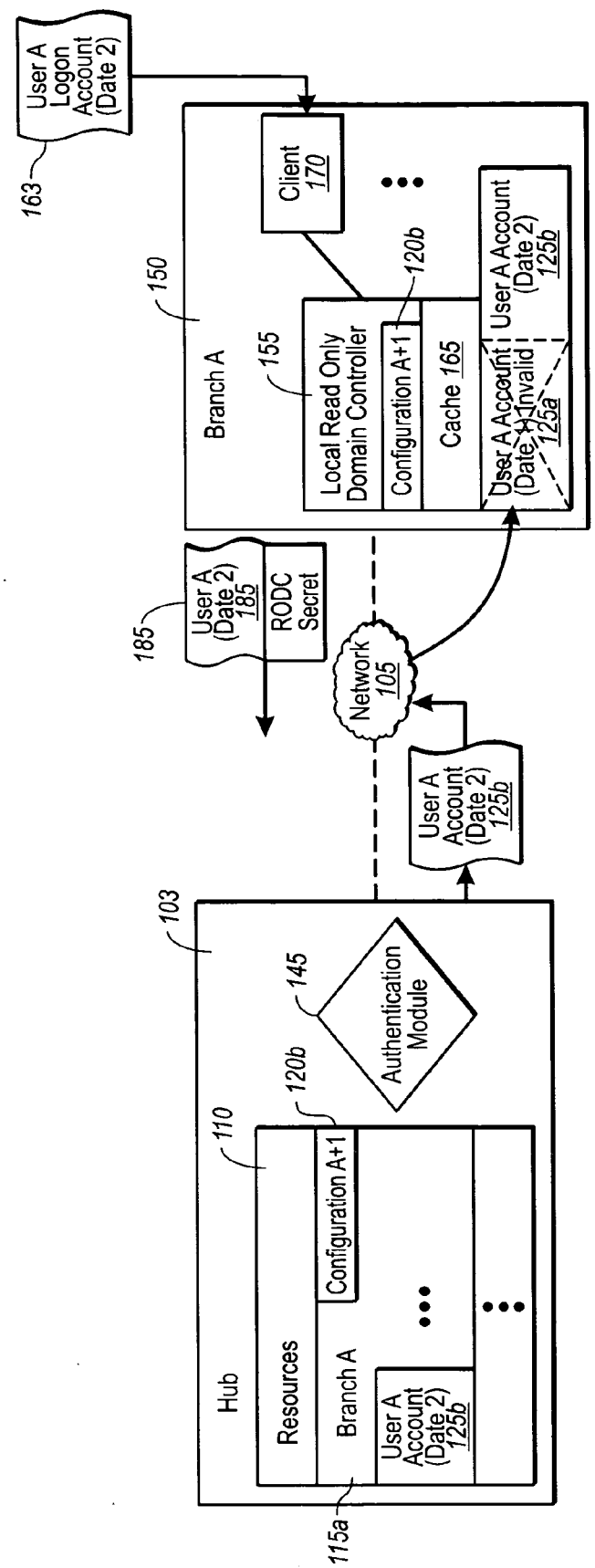
FIG. 2B illustrates the domain controller hierarchy as shown in FIG. 2A, in which a user at the local branch attempts to logon to a client computer system based on a new password.

For example, FIGS. 2A and 2B illustrate a similar sequence as shown in the preceding FIGS. 1A-1B, albeit from the perspective of nullifying a secret, and updating a secret at a local branch. As shown, secure and non-secure resources can be provided to the local domain controller on a lease, subject to some criterion, such as length of time, or the like. For example, a local domain controller may not need to access a file, file system, or run a certain application after a certain length of time. Alternatively, the user might be leave employment in the following weeks and thus will have a user account that needs to be changed or invalidated.

Since the system 100 is configured essentially for unidirectional updates, changes to resources at the hub domain controller 103 will need to be conveyed to the relevant local domain controller (e.g., 155) through a communication channel. In one instance, this can be done whenever there is a change to resource information in the resource component 110 for a given branch's resources. In another instance, this updating may be done on a periodic basis, such as if the local domain controller (e.g., 155) is configured to receive resource updates every few hours, every couple of days, or the like. Thus, the communication channel for sending and receiving configuration information might have a periodic time trigger, while the different communication channel used for transmitting secrets (e.g., secure user accounts) is asynchronous with the channel used for communication configuration information. That is, the communication channel used for communicating secrets is not necessarily time dependent, and can be triggered primarily based on local action requests, such as a user logon request.

For example, FIG. 1A shows that the resources component 110 has an updated version (i.e., "Configuration A+1") of the configuration information 120b for the "Branch A" resources 115a. The user account has also been updated to reflect a new password recorded at a later date (i.e., "date 2"), such that the prior version of the user account 125a is no longer valid. In one implementation, this involves the hub domain controller setting metadata associated with the user account 125a (or to the configuration information) to a timestamp of "0", such that the metadata for the user account 125a are in an "invalid state". In another implementation, this involves the hub domain controller simply sending an updated version of the user account to the local domain controller 155, which signals to the local domain controller 155 that the prior version of the user account is invalid. This too can cause the local domain controller 155 to set the metadata of the prior version of the user account to a timestamp of "0" (i.e., invalid metadata state), and/or to simply delete the prior version of the secret.

In any event, FIG. 2A shows that the hub domain controller 103 passes a new message 153 that includes the updated configuration information ("A+1") 120b, and also includes information that the prior user A account 120a is no longer valid (i.e., has a timestamp of 0). That is, the hub domain controller 103 does not send the updated account 125*b* with the periodic configuration updates, but sends the updated account 125*b* when later requested through a different communication that, in some cases, is more secure than that communication channel used for sending periodic updates. The hub domain controller 103 therefore does not necessarily send secure and non-secure information to a local domain controller (e.g., 155) at the same time through the same communication channel, which provides an extra layer of security to system 100.

When the local domain controller receives the updated information 153, the new configuration information 120*b* replaces the prior configuration information 120*a*. In one implementation, update configuration messages (or update messages for secrets), such as the new configuration information 153, sent by the hub domain controller 103 can also include certain major and minor information based in part on one or more timestamps. For example, an update message can include a major identifier based on a timestamp, or other indicia, for a new version of the secret, as well as a minor identifier of the invalid state (i.e., timestamp=0). This allows the update message to be more current than any duplicates of an out-of-date secret that are inadvertently received by the local domain controller 155, while at the same time being less current than the new version of the secret. As such, implementations of the present invention include ordering concepts not just for versions of a secret, but also for messages invalidating a secret.

In any event, FIG. 2B shows that the prior configuration information 120*a* at the local domain controller 155 is now invalid, and the local domain controller is now configured for configuration 120*b*, or "Configuration A+1". In addition, the information in message 153 that the prior secure information 125*a* is now invalid causes the local domain controller 155 to invalidate the cached information 125*a*.

In particular, since the local domain controller 155 knows there is a newer version of the password, the local domain controller 155 can invalidate the password by signaling the account as "invalid", deleting the account. In addition, since the local domain controller 155 is aware of the newer version of the account, any received earlier versions of the user account will be automatically discarded or deleted. This can help accommodate errors that can occur when the configuration information arrives at a different point in time than previously sent sensitive but invalid versions of information. As such, if the user tried to logon using previously valid (but not invalid) information 160 for account 125*a* at a branch 150 client computer system, the local domain controller 155 would deny access since the prior version of the secret is either unusable or simply missing.

The user can, however, present the new, updated logon information and gain client computer system 170 access, if the local domain controller 155 is connected to the network 105. For example, as shown in FIG. 2B, and similar to FIGS. 1A-1B, the user can request a logon with client computer system 170 using logon information 163. Since this updated user account is not stored in cache 165, the local domain controller passes the request in a separate message 185, along with the local domain controller's secret over the network to the central hub 103. The authentication module 145 processes message 185, and verifies whether the local domain controller's secret and the user's provided logon information 163 are valid. If one or the other component of message 185 are not valid, the hub controller 103 sends an error response (not shown).

On the other hand, if the credentials provided in message 153 are valid, the authentication module retrieves the updated user account 125*b*, and passes it back to the branch 150. For example, as shown in FIG. 2B, the central hub domain controller 103 passes the updated user account 125*b* back to the local domain controller 155 over the network 105, and the local domain controller 155 stores the updated account 125*b* in cache. As such, the user is able to logon to client system 170 at a later date with the updated account information by virtue of interacting through the local domain controller 155.

The schematic diagrams and preceding discussion of FIGS. 1A through 2B therefore provide a number of mechanisms for ensuring that local domain controllers can be used at a local branch office in a semi-writable, albeit read-only fashion. Because configuration information can only come from the hub domain controller, there may be a reduction of what a local user can do to inadvertently or maliciously cause problems that would need immediate fixing by a main network administrator. Furthermore, since secure company information is not transmitted with non-secure information, and since secure company information is partitioned only to specific branches, the liability associated with local domain controller compromise is substantially limited.

Figure 3A:
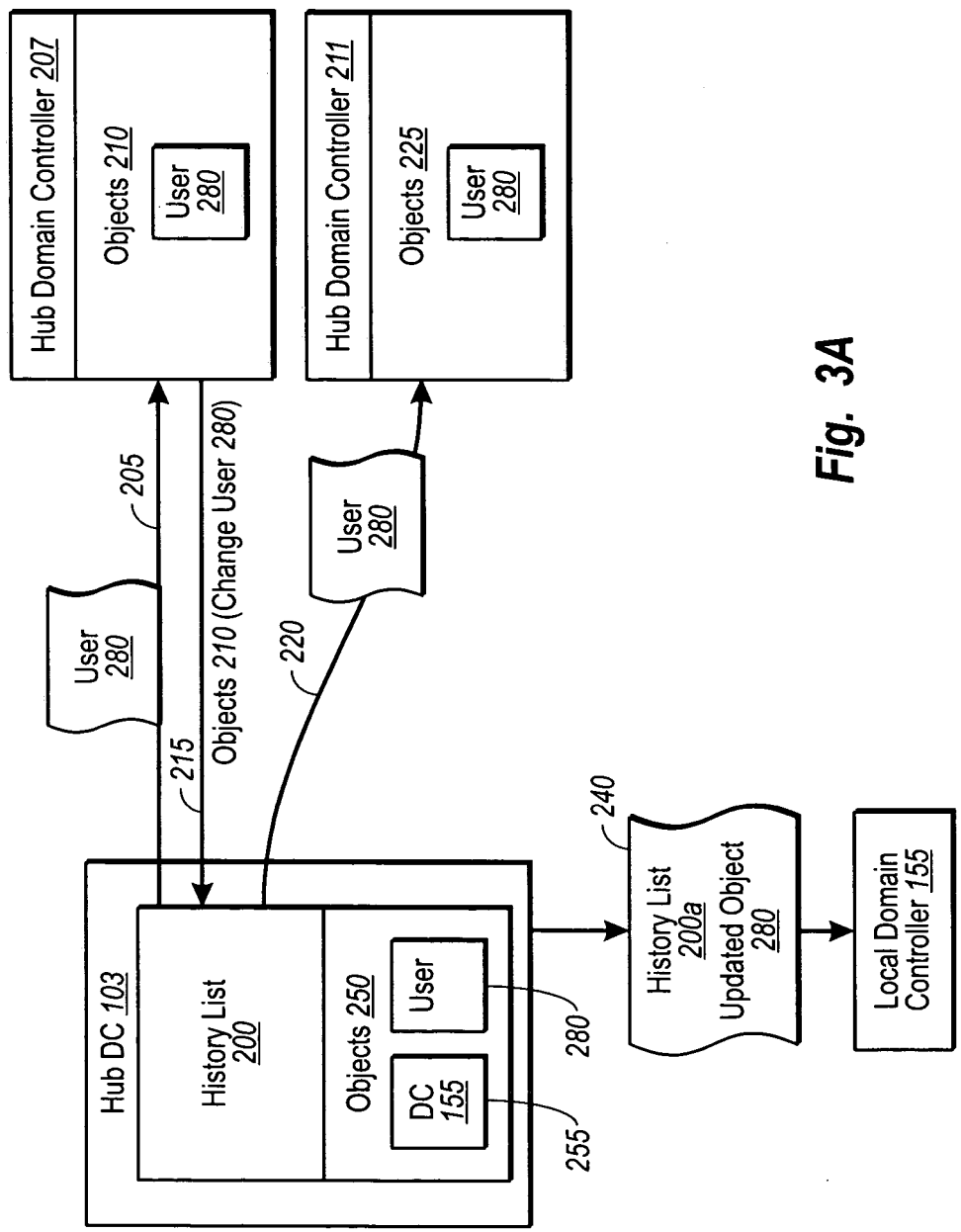
FIG. 3A illustrates an implementation of the present invention in which hub and local domain controllers are configured to maintain accurate history lists of where secure and/or non-secure resources have been revealed.
Figure 3B:
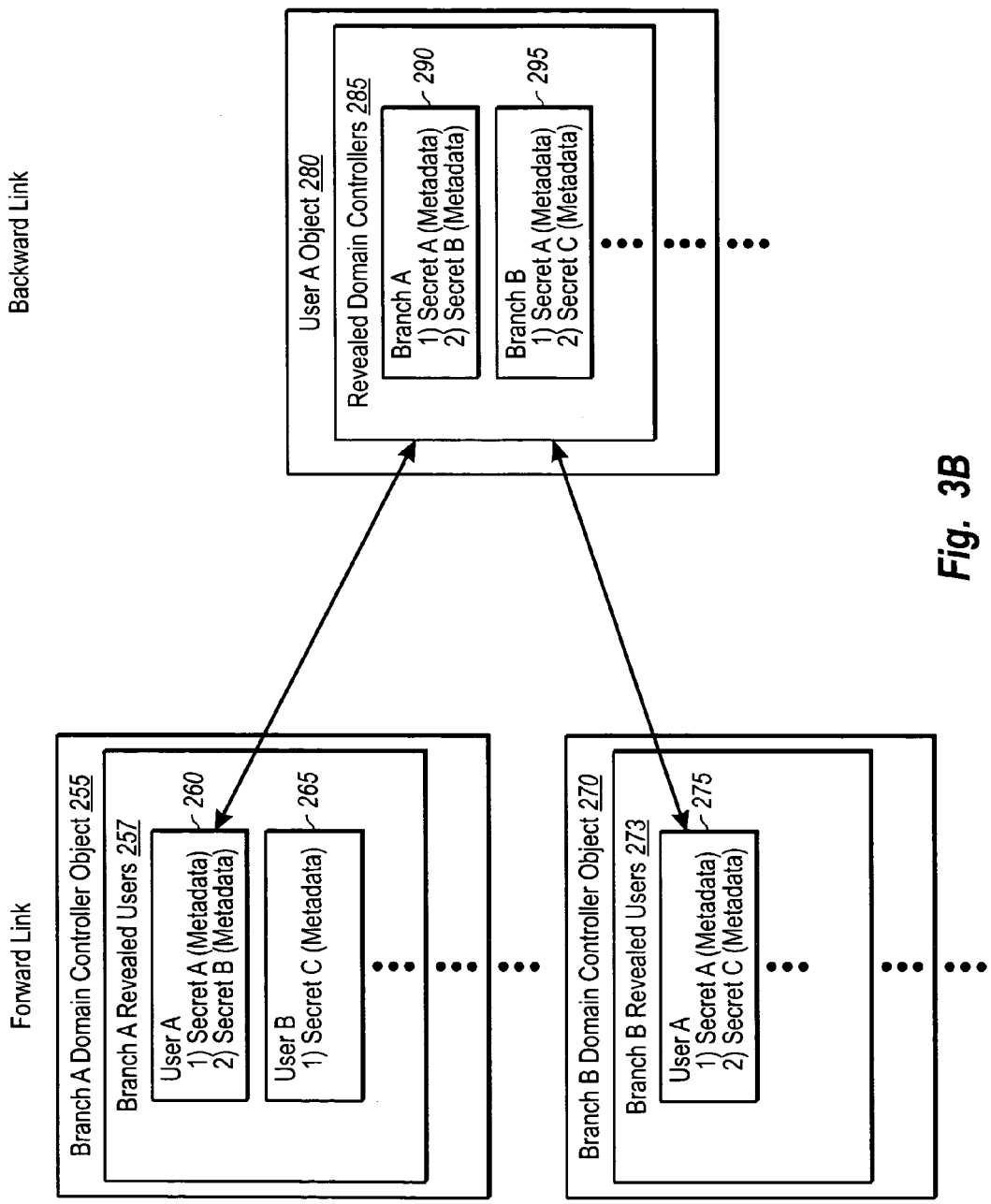
FIG. 3B illustrates an implementation of the present invention for relating secure and/or non-secure resources among objects that are correlated with one or more history lists.

FIGS. 3A and 3B illustrate schematic diagrams for monitoring when and where secrets are disclosed, thereby enabling an authorized network administrator to effectively ascertain the extent of damage upon a security breach. In particular, FIG. 3A shows that the hub domain controller 103 includes a history list 200 that is used to maintain information regarding where, how, and when certain secrets were revealed within the domain hierarchy. In one implementation, the history list can also be configured to maintain a given record as early as desired (albeit typically as long as the lifetime of the given resource), such as several minutes, or several days or weeks, which can further limit the amount of information that can be potentially compromised. In any event, the history list 200 contains information that is correlated with a set of objects 250, including an object for each user (e.g., user object 280) and an object for each local domain controller (e.g. domain controller object 255). Two or more of the objects in the set 250 are linked to each other to provide correlated information to the history list 200.

For example, each time a resource (e.g., a secret for a user account) is authorized to be sent (e.g., the resource is changed and needs to be updated locally) to a given local domain controller, the hub domain controller 103 writes the relevant information from the given object for the resource to the history list 200. The written information includes certain metadata, as shown and described with respect to FIG. 3B, including an identifier for the secret, the domain controller where the secret is to be sent, and so on. The resource is then passed to the authorized local domain controller, as described in FIGS. 1A-1B. The hub domain controller 103 then replicates the history list 200 to all of the local domain controllers (e.g., local domain controller) in the domain controller hierarchy. For example, FIG. 3A shows that the hub domain controller 103 can communicate a history list with at least local domain controller 155, which also maintains any such received history list locally.

The domain controller hierarchy can also be configured to ensure that entries (e.g., object information) in the history list 200 remain up-to-date at the hub and locally, via periodic updates. For example, the hub domain controller 103 can be configured to periodically receive entries (e.g., message 215) of object data (e.g., user object 280) maintained at other hub domain controllers (e.g., 207, 211), and to send corresponding object updates (e.g., 205), when appropriate. Any object changes (e.g., message 215) received from a given hub domain controller (e.g., 207) can then be correlated at the hub domain controller 103. If the hub domain controller 103 has lost an object or has an old version of an object, such as due to a system crash, the hub domain controller can repair its set of objects 250 based on the received entries from other hub domain controllers.

When the hub domain controller 103 needs to send the updated object to local domain controller 155, the hub domain controller 103 deletes the prior version or entry of the object in the prior history list 200. The hub domain controller 103 also creates a new record for the updated object in a new, updated history list (e.g., 200a). FIG. 3A then shows that the hub domain controller 103 sends the updated history list 200a to the local domain controller 155. This can allow the hub domain controller 103 to be aware what has been "revealed" to the local domain controller.

FIG. 3B illustrates how objects (e.g., 255 and 280) can be linked together with specific metadata properties to ensure that resource information is accurate and distinct within the domain hierarchy. In one implementation, this linking of data can be used to determine when and where secrets for a given user have been sent. For example, FIG. 3B shows that links between objects can be divided into "forward" links and "backward links", each object containing information when sharing of a given resource for that object is authorized. In particular, the forward links represent a list of information in a domain controller object 255 of users for whom a resource, such as an account secret, has been received (or has been authorized to be received). By contrast, the backward links represent a list of information in a user object 280 of domain controllers where the secret has been sent (or has been authorized to be sent).

As such, FIG. 3B shows that the Branch A domain controller object 255 includes forward links for a User A partition 260, such that secrets A and B for User A have been received; and a forward link for the User B partition 265, such that secret C for User B has been received. Similarly, another Branch B object 270 includes a revealed users list 273 showing that secrets A and C for the User A partition 275 have been received. The User A object 280 also includes a revealed domain controllers list 285, or a list that indicates where secrets for the User A object 280 have been revealed. In particular, the revealed domain controllers list 285 shows a Branch A partition 290, that indicates that secrets A and B have been shared with Branch A, and a Branch B partition 295, that indicates that secrets A and C have been shared with Branch B.

The data of each object can then be correlated with the history list 200, and can be queried by the system administrator to determine specifically which version of a resource (e.g., an account secret) is revealed for whom and at what location. In one implementation, this ability to identify discrete aspects of each secret is possible due to the metadata associated with each secret. For example, FIG. 3B shows that each revealed list in a domain controller object or user object includes metadata. In general, the metadata include an identifier for the secret that has been revealed, as well as version information, date created, information about what domain controller originated the information, and so on. The metadata is then used to form a unique key that keeps the revealed list entry unique for each update to the resource for each version, and for each user.

Some exemplary metadata that can be included for a given key for a secret include:
  An attribute type, such as an attribute whose meta-data is represented by the remaining fields;
  An update sequence number, such as a value corresponding to the last change on the entry;
  A version number, such as an indicator that this is the second version of an entry;
  A time changed identifier, such as a time stamp corresponding to a date of the last change to the entry;
  A domain controller identifier, such as an identifier of the domain controller that did the last originating write operation on the entry; and
  A domain controller update sequence number identifier, such as an update sequence number corresponding to the last originating write operation in the originating domain controller's update sequence number space.

In combination, each of these pieces of metadata creates a unique key that is different for every resource throughout the domain controller hierarchy. As such, no two secrets for different users are confused, and no two versions of the same secret for the same user are confused. As previously mentioned, this provides a level of certainty to the administrator if trying to ascertain which user secrets might have been compromised in the event a local domain controller is compromised.

The present invention can also be described in terms of one or more acts for accomplishing a method in accordance with the present invention. In particular, FIG. 4 illustrates a flowchart of methods from the local domain controller and the hub domain controller perspectives for communicating selected secrets in an efficient manner. In addition, FIGS. 5 and 6 illustrate a flowchart of methods from the perspective of a hub domain controller for maintaining revealed lists, and for keeping revealed list information up-to-date. The methods illustrated in FIGS. 4-6 will be described with respect to the preceding FIGS. 1A through 3B and accompanying text.

For example, FIG. 4 shows that a method from the perspective of a local domain controller for authenticating user information comprises an act 300 of receiving a user request for an action. Act 300 includes receiving a user request for an action at a client computer system, wherein the user request requires authentication. For example, a user requests login access at a client computer system 170 of branch 150, and provides corresponding logon information through request 160. Login access is, however, only one type of action that may be requested. For example, the user might request access to a file or file system, or access to some other resource, which might require additional or separate authentication. The method also comprises an act 310 of determining that the user request cannot be processed. Act 310 includes determining that the user request cannot be processed with information stored at the local domain controller. For example, as shown in FIG. 1A, no secrets, such as user accounts, are presently stored in the cache 165 of the local domain controller 155, and, as such, the local domain controller 155 cannot validate any information provided in request 160.

FIG. 4 also shows that the method comprises an act 320 of sending the user request to a hub domain controller. Act 320 includes sending the user request to a hub domain controller over a network. For example, local domain controller 155 sends request 180, which includes the user provided information in request 160, as well as a local domain controller secret to the hub domain controller 103 over network 105. In one implementation, as described herein, the local domain controller secret is a secondary secret shared only between the local domain controller 155 and the hub domain controller 103. Prior to sending the user request to the hub domain controller, the local domain controller can also be configured to authenticate the user based on basic information in order to help present unauthorized users from spoofing and pulling down secrets inappropriately.

Furthermore, FIG. 4 shows that the method from the hub domain controller 103 perspective comprises an act 330 of receiving a user request from a local domain controller. Act 330 includes receiving a user request, via a local domain controller, for an action at a client computer system in a branch location. For example, hub domain controller 103 receives message 183, which includes the user provided information from request 160, as well as a local domain controller secret. In addition, the method from the hub domain controller 103 perspective comprises an act 340 of identifying the user as authorized. Act 340 includes identifying that the user is authorized to request the action at the branch location. For example, authentication module 145 determines that the user account 125a is partitioned with the appropriated resources 115a for the branch 150. If the user account 125a is not associated with these partitioned resources 155a (i.e., the user is allowed access only to "Branch C" resources 115c through requesting Branch A resources), the hub domain controller 103 automatically rejects the request.

The method from the hub domain controller 103 perspective also comprises an act 350 of identifying that the user request is valid. Act 350 includes identifying that the user request is consistent with a secret maintained at the hub domain controller. For example, the authentication module 145 at the hub domain controller 103 verifies that the information (e.g., user name and password) provided by the user in request 160 is consistent with the information found in the current version of the account 125a in the resource partition 115a.

Furthermore, the method from the hub domain controller 103 perspective comprises an act 360 of sending a secret to the local domain controller. Act 360 includes sending the secret to the local domain controller, such that a subsequent user request for the action can be authenticated by the local domain controller at the branch location. For example, upon verifying that the credentials provided by the user and by the local domain controller are appropriate, the hub domain controller 103 sends the user account 125a to the local domain controller 155, where the account can be stored in cache 165.

Accordingly, FIG. 4 shows that the method from the local domain controller 155 perspective also comprises an act 370 of receiving a secret for the request. Act 370 includes receiving a secret for the user's request from the hub domain controller. For example, as shown in FIG. 3B, the local domain controller 155 receives from hub domain controller 103 user account 125a over network 105. This means, of course, that if the network 105 is down, or if the hub domain controller 103 or local domain controller 155 is unavailable over network 105 for any reason, the user will not be able to perform the requested action (e.g., logon to local client system 170) if it is a first attempt for that action.

The method from the local domain controller 155 perspective also comprises an act 380 of storing the secret in cache. Act 380 includes storing the secret in the local domain controller cache, such that a subsequent user request for the action can be authenticated by the local domain controller. For example, the local domain controller 155 receives the user account 125a from the hub domain controller 103, and stores the user account 125a in cache. The local domain controller 155 also receives instructions to allow the user to logon to the corresponding client computer system, and therefore allows access. Since the user account 125a is now stored at the local domain controller 155 cache 165, future logon requests by this user at this branch 150 will be handled by the local domain controller 155, rather than by a request of the hub domain controller 103 over network 105.

As such, future user requests for this action and this version of the secret do not necessarily require the network 105 to be functioning between the local domain controller 155 and the hub domain controller 103. On the other hand, for a different action (e.g., a new login for a different user, access to a different protected resource) or based on a change in the secret, the network 105 will need to be functioning in order for the user to access the resource using the new account. As such, the system 100 and methods describe herein provide ways to centralize and delegate a number if of non-secure and secure functions, in order to preserve ease of local use, while at the same time enhancing security of the same.

FIG. 5 illustrates a method from the hub domain controller (e.g., 103) perspective for maintaining an up-to-date history list of revealed resources. As shown, the method comprises an act 500 of receiving a request for a secret at a local domain controller. Act 500 includes receiving a request for a secret from a local domain controller based on a user request. For example, hub domain controller 103 receives a user logon request via message 180 from local domain controller 155, where the request is based on information for user account 125a. The method also comprises an act 510 of updating user object data for a history list. Act 510 includes updating a user object with information that the requested secret is revealed to the local domain controller. For example, upon determining that the secret can be sent to the requesting local domain controller, but prior to sending the secret, the hub domain controller 103 updates the user object 280 that secret A is revealed at Branch A. The updated information for the user object 280 is then written to history list 200.

FIG. 5 also shows that the method comprises an act 520 of updating a domain controller object for the history list. Act 520 includes updating a domain controller object with information that the requested secret is associated with a given user and is revealed to the domain controller. For example, and also prior to sending the secret to the requesting local domain controller (e.g., 155), the hub domain controller 103 updates the domain controller object 255 to indicate that secret A for User A is revealed at Branch A. The updated information for the domain controller object 255 is then written to the history list 200.

In addition, the method shown in FIG. 5 further comprises an act 530 of sending the secret to the local domain controller. Act 530 includes sending the secret to the local domain controller after the history list has been updated. As such, the method illustrated and described with respect to FIG. 5 provides at least one way to ensure that information held by the local domain controller is generally not more up-to-date than what the hub domain controller 103 understands is being held at the local domain controller.

FIG. 6 shows that a method from the hub domain controller perspective for ensuring that a history list is up-to-date at the hub domain controller comprises an act 600 of receiving an object update. Act 600 includes receiving one or more object updates from one or more hub domain controllers in a domain controller system. For example, hub domain controller 103 receives object update 215 from hub domain controller 207 indicating that the user object 280 found at the hub domain controller 103 and hub domain controller 207 has changed.

The method also comprises an act 610 of receiving a request for the object. Act 610 includes receiving a request for an updated version of the object from a local domain controller. For example, the hub domain controller 103 receives a user logon request (e.g., 163) that is based on an updated form of a user account represented by user object 280.

FIG. 6 further shows that the method comprises an act 620 of correcting the history list. Act 620 includes correcting a history list stored at the hub domain controller based on the received object update. For example, the hub domain controller 103 deletes a prior record in history list 200 for the prior version of the object, and creates a new record in a new, updated version of the history list (e.g., 200a). The hub domain controller 103 makes changes in the history list prior to sending the updated object (e.g., via message 215) to the local domain controller (e.g., 155, FIG. 3A) to be cached. Thus, the hub domain controller 103 ensures it records any version changes to objects/resources before revealing the objects/resources to a lower level domain controller.

In addition, FIG. 6 shows that the method comprises an act 630 of sending an updated history list. Act 630 includes sending the updated history list to the local domain controller from which the request for the object was received. For example, as shown in FIG. 3A, the hub domain controller 103 sends message 240, which includes an updated copy of the history list 200, or history list 200a. The hub domain controller 103 can also send the updated object with the history list, or send the updated object in a separate message before or after sending the history list, so long as the history list is updated before any transmission of objects is made.

Accordingly, the schematics and methods described herein provide a number of ways in which secure resources can be shared efficiently among multiple domain controllers. Furthermore, these schematics and methods provide a number of useful tools for readily identifying highly granular information, such as what entity has access to what resources, what accessor has access to what resources at what entity, and so on. This provides a number of advantages, both in terms of resource management, as well as in terms of security, since the amount of resources that can be compromised at a given branch is limited, and since an administrator can quickly identify what resources might have been revealed in such a compromise.

In addition, one will appreciate that embodiments of the invention include or are incorporated in computer-readable media having computer-executable instructions or data structures stored thereon. Examples of computer-readable media include RAM, ROM, EEPROM, CD-ROM, DVD, or other optical disc storage, magnetic disk storage or other magnetic storage devices, or any other media capable of storing instructions or data structures, and capable of being accessed by a general purpose or special purpose computer. Computer-readable media also encompasses combinations of the foregoing structures. Computer-executable instructions comprise, for example, instructions and data that cause a general purpose computer, special purpose computer, or special purpose processing device to execute a certain function or group of functions. Computer-executable instructions and associated data structures represent an example of program code means for executing the steps of the invention disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a hub domain controller in a computerized environment in which a branch domain controller receives secrets from the hub domain controller in a domain controller system, a method of maintaining a history list of revealed secrets with the branch domain controller, such that information regarding which secrets have been revealed to the branch domain controller can be determined efficiently, comprising the acts of:

updating a branch domain controller object with information that an initial version of a secret is revealed to a user that is accessing the domain controller system via a branch domain controller, the branch domain controller object being stored at the hub domain controller, including a backward link at the hub domain controller representing a list of domain controllers, including the branch domain controller, that have received the initial version of the secret, wherein updating the branch controller object further comprises updating the backward link, and wherein updating the backward link comprises updating the metadata associated with the branch domain controller object, wherein the metadata further comprises a unique key associated with the initial version of the secret;

updating the history list stored at the hub domain controller to indicate that the initial version of the secret has been revealed to the branch domain controller, wherein the history list comprises a list of branch domain controller objects in the domain controller system, user objects associated with one or more of the branch domain controller objects, and metadata indicating when and to which of the branch domain controllers represented by branch domain controller objects the initial version of the secret is revealed, sending the initial version of the secret to the branch domain controller; and sending the history list associated with the updated branch domain controller object to the branch domain controller.

2. The method as recited in claim 1, further comprising an act of sending the history list to one or more different hub domain controllers in the domain controller system, such that the one or more different hub domain controllers can identify that the initial version of the secret has been revealed to the branch domain controller.

3. The method as recited in claim 1, further comprising an act of updating a user object for the user with information indicating that the initial version of the secret is revealed to the branch domain controller.

4. The method as recited in claim 2, wherein the history list is further associated with the updated user object, the method further comprising an act of receiving an update to the initial version of the secret, such that an updated version of the secret is valid, and such that the initial version of the secret is invalid.

5. The method as recited in claim 4, wherein the initial version of the secret includes metadata used to form a corresponding initial key, such that the update to the initial version of the secret includes updated metadata that form a corresponding updated key.

6. The method as recited in claim 5, further comprising updating the history list to reflect the updated metadata for the updated version of the secret, wherein the history list includes metadata corresponding to the initial version of the secret and to the updated version of the secret.

7. The method as recited in claim 5, wherein the metadata include an update sequence number, such as a value corresponding to a last change to a prior version of the initial version of the secret.

8. The method as recited in claim 5, wherein the metadata include a version number for the initial version of the secret, and a time stamp corresponding to a date of a recent change to the initial version of the secret.

9. The method as recited in claim 5, wherein the metadata include a domain controller identifier that identifies any of the hub domain controller of one of the one or more different hub domain controllers that originated a recent change on the initial version of the secret.

10. The method as recited in claim 9, wherein the metadata include a domain controller update sequence number identifier that identifies an update sequence number corresponding to a last originating write operation in the originating hub domain controller's update sequence number space.

11. The method as recited in claim 4, wherein the updated version of the secret is received from one or more different hub domain controllers in the domain controller system.

12. The method as recited in claim 4, further comprising the acts of:
   deleting the initial version of the secret at the hub domain controller; and
   sending an indication to the branch domain controller that the initial version of the secret is no longer valid.

13. The method as recited in claim 4, further comprising an act of sending the updated version of the secret to the branch domain controller upon request for the updated version of the secret.

14. The method as recited in claim 13, further comprising an act of updating a branch domain controller object to reflect that the updated version of the secret has been created for a user object.

15. The method as recited in claim 14, further comprising an act of updating the user object to reflect that the updated version of the secret has been sent to the branch domain controller.

16. The method as recited in claim 4, further comprising an act of sending an updated version of the history list to the branch domain controller, wherein the updated version of the history list indicates that the updated version of the secret has been revealed to the branch domain controller.

17. The method as recited in claim 16, wherein the updated version of the history list is sent to the branch domain controller before sending the updated version of the secret to the branch domain controller.

18. The method as recited in claim 4, further comprising:
   an act of receiving an indication that one or more secrets stored at the branch domain controller have been compromised; and
   a step for determining that the updated version of the secret has not been compromised at the branch domain controller.

19. The method as recited in claim 18, wherein the step for determining that the updated version of the secret has not been compromised comprises the acts of:
   comparing an entry for the initial version of the secret in a history list sent to the branch domain controller with the updated version of the secret stored at the hub domain controller; and
   identifying from the history list that the initial version of the secret has been revealed to the branch domain controller, and that the updated version of the secret has not been revealed to the branch domain controller.

20. At a hub domain controller in a computerized environment in which a local domain controller receives secrets from the hub domain controller, a computer storage medium having computer-executable instructions stored thereon that, when executed, cause one or more processors to perform a method of maintaining a list of revealed secrets with the local domain controller, such that information regarding which secrets have been released to the local domain controller can be determined efficiently, comprising the acts of:
   updating a branch domain controller object with information that an initial version of a secret is revealed to a user that is accessing the domain controller system via a branch domain controller, the branch domain controller object being stored at the hub domain controller, including a backward link at the hub domain controller representing a list of domain controllers, including the branch domain controller, that have received the initial version of the secret, wherein updating the branch controller object further comprises updating the backward link, and wherein updating the backward link comprises updating the metadata associated with the branch domain controller object, wherein the metadata further comprises a unique key associated with the initial version of the secret;
   updating a history list stored at the hub domain controller to indicate that the initial version of the secret has been revealed to the branch domain controller, wherein the history list comprises a list of branch domain controller objects in the domain controller system, user objects associated with one or more of the branch domain controller objects, and metadata indicating when and to which of the branch domain controllers represented by branch domain controller objects the initial version of the secret is revealed;
   sending the initial version of the secret to the branch domain controller;
   sending the history list associated with the updated branch domain controller object to the branch domain controller;
   receiving an updated version of the secret at the hub domain controller; and
   updating the history list, such that the metadata associated with the initial version of the secret is invalidated and new metadata is created indicating when and to which of the branch domain controllers represented by branch domain controller objects the updated version of the secret is revealed.

* * * * *